United States Patent [19]

Monpetit

[11] 3,913,030

[45] Oct. 14, 1975

[54] OSCILLATORS USED IN DEVICES FOR MEASURING A DISPLACEMENT

[75] Inventor: Louis Monpetit, L'Etang-la-Ville, France

[73] Assignee: Societe des Procedes Modernes d'Injection Sopromi, Clichy, France

[22] Filed: June 4, 1974

[21] Appl. No.: 476,198

[30] Foreign Application Priority Data

June 15, 1973 France .............................. 73.21823

[52] U.S. Cl. ...................... 331/65; 328/1; 328/185; 307/273; 331/111

[51] Int. Cl.² ........................................ H03K 4/50

[58] Field of Search ............. 331/111, 113, 143, 65; 307/301, 293, 273; 328/1, 185

[56] References Cited

UNITED STATES PATENTS

| | | | |
|---|---|---|---|
| 3,085,165 | 4/1963 | Schaffert et al. | 307/301 |
| 3,271,700 | 9/1966 | Gutzwiller | 307/301 |
| 3,327,134 | 6/1967 | Keane | 307/301 |
| 3,378,702 | 4/1968 | Burke | 307/293 |
| 3,441,874 | 4/1969 | Bennett | 331/111 |
| 3,551,704 | 12/1970 | Baum | 331/111 |

OTHER PUBLICATIONS

Electronic Design, May 10, 1965, pp. 47.

GE Transistor Manual, pp. 337, 1964.

*Primary Examiner*—John Kominski
*Attorney, Agent, or Firm*—Darby & Darby

[57] ABSTRACT

An oscillator unit responsive to a change in capacitance produced by a variable capacitor in response to a physical change in which the current for charging the capacitor is increased for a time to produce a more linear charge.

9 Claims, 3 Drawing Figures

OSCILLATORS USED IN DEVICES FOR MEASURING A DISPLACEMENT

The invention relates to an improvement in an oscillator intended for use in a device for measuring a displacement, the device containing an element which moves as a function of the displacement to produce a change in a capacitance value.

The use of such measuring devices is known in electric or electronic circuits forming an impedance bridge which is supplied by an alternating current source. The present invention is intended for devices of this type incorporating an astable or monostable multivibrator wherein the variations in capacitance are expressed by either a variation in output frequency (pulse rate) or by a variation of cyclic ratio (total period, or frequency) of the multivibrator.

Devices of this nature are generally known. Their total capacitance is composed as a combination of the value of the variable capacitor and an almost inevitable parasitic capacitance. The parasitic capacitance is undesirable since it adversely affects the linearity of the response of the device.

With a view to avoiding this drawback, the object of the present invention is an improvement in the oscillators used in devices for measuring a displacement which devices include a variable capacitor having a movable element responsive to the displacement being measured to produce a change in capacity. The capacitor is part of a charging circuit and an element is connected thereto which is sensitive to a threshold charge potential to produce a signal. In accordance with the invention, the charge current of the capacitor is increased by a supplementary current during a fixed brief period at the start of its charge period.

The invention is described below with reference to the attached drawing in which.

Figure 1:
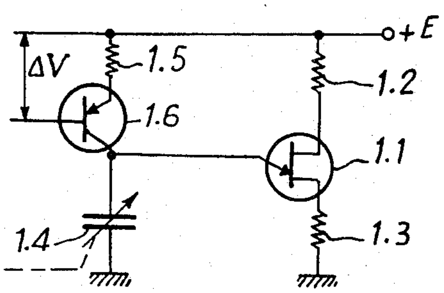
Fig: 1 PRIOR ART
FIG. 1 is an electrical circuit diagram of a measuring device of known type including a variable capacitor.

FIG. 1 shows an example of a typical prior art relaxation type oscillator utilizing a uni-junction transistor 1.1 and a variable measuring capacitor 1.4. The uni-junction transistor 1.1 is connected between a source of voltage E and the common point by a resistor 1.2 and a very low value resistor 1.3. The variable capacitor 1.4 is connected in series between the voltage source and the common point by a resistor 1.5 of value R, and a transistor 1.6. The emitter of the uni-junction transistor 1.1 is connected to the junction of the collector of transistor 1.6 and capacitor 1.4. The base of transistor 1.6 is at a potential ΔV with respect to the source of potential E. Transistor 1.6 is traversed by a current:

$$i = \frac{\Delta V}{R} \qquad (1)$$

For the sake of simplicity, the value of the base-emitter voltage of transistor 1.1 can be disregarded. It follows that capacitor 1.4, constituting the measuring device, charges from zero, to a variable potential:

$$V = \frac{it}{C} = \frac{\Delta Vt}{RC} \qquad (2)$$

$t$ designating the charge time. The capacitor 1.4 is variable and its capacitance changes in accordance with the measurement of a physical parameter. This is shown by a dotted line connected to the variable element of the capacitor which is symbolic of the connection of the physical member to the capacitor.

When the value of V becomes equal to a certain reference value V$r$ (or potential threshold), defined essentially by the intrinsic characteristics of the uni-junction transistor 1.1, the emitter-base junction of this transistor becomes conductive and quickly discharges capacitor 1.4 through the very low value resistor 1.3. After the discharge, uni-junction transistor 1.1 is reblocked and a fresh oscillation can start. It is possible to prevent the start of a fresh oscillation for example by blocking transistor 1.6.

In the case under consideration, a fresh oscillation can be triggered by an outside signal of fixed frequency, and the cyclic ratio (period) can be varied as a function of the variation of the capacitance. The period of the cycle will be $$T = \frac{VrC}{i} = \frac{VrCR}{\Delta V} \qquad (3)$$

Calling $x$ the mechanical quantity producing the variation in the value C of the capacitor 1.4, there are, in general, two types of variations:

$$1.\ C = A \pm Bx \qquad (4.1)$$

This represents a linear variation of the capacity. $A$ and $B$ are constants of device, such a device is represented, for example, by the capacity of two coaxial cylindrical conductors the relative position of which is displaced along their common axis.

$$2.\ C = \frac{1}{(A \pm Bx)} \qquad (4.2)$$

Here $A$ and $B$ designate the constants of a device, in which, for example, the quantity $x$ causes the distance between two plates of a capacitor to vary.

If such devices are inserted in a circuit such as that of FIG. 1, we obtain:

$$T = \frac{VrR}{\Delta V} \cdot (A \pm Bx) \qquad (5)$$

for the first type of device, and $$T = \frac{VrR}{\Delta V} \cdot \frac{1}{A \pm Bx} \qquad (6)$$

for the second type.

As a matter of fact, in practice, the measuring capacitor 1.4 is connected in parallel with a parasitic capacitance due to the device itself and/or the parasitic capacitances of the circuit and the connections.

Calling the parasitic capacitance value Cp, the above equations are written:

$$T = \frac{VrR}{\Delta V}(A \pm Bx + Cp) \tag{7}$$

in the first case, and $$T = \frac{VrR}{\Delta V}\left(\frac{1}{A \pm Bx} + Cp\right) \tag{8}$$

in the second case.

The quantities (A ± Bx) can in no case be negative. The result is limitations of uses in both cases, but this fact is particularly troublesome in the second case when we wish to use the frequency of the oscillator as an output signal.

As a matter of fact, if we consider a device of the second type mounted in a circuit such as (or similar to) the one in FIG. 1, we have, in principle, a device capable of producing an output frequency:

$$f = \frac{1}{T} = \frac{\Delta V}{VrR}(A \pm Bx) = \frac{i}{Vr}(A \pm Bx) \tag{9}$$

which is a linear function. The presence of the term Cp modifies the equation, which becomes:

$$f = \frac{1}{T} = \frac{i}{VR} \cdot \frac{1}{\frac{1}{A \pm Bx} + Cp} \tag{10}$$

This equation has a defect of linearity that can be troublesome, particularly when we wish to make use of the mean value of the frequency, varying rapidly around this value.

The circuit according to the present invention aims to improve this situation. The improvement includes charging, for a given time, $\Delta t$, at the beginning of each period, the total capacitance C, by a current $(i + \Delta i)$, then, when time $\Delta t$ has elapsed, in continuing the charge normally with current $i$.

It follows that the equations representing the system are:

For time $\Delta t$, the charge is $$C\Delta\ (i + \Delta i) \tag{11}$$

or a potential:

$$\Delta V = \frac{\Delta T\ \ (i + \Delta i)}{C} \tag{12}$$

Then, for the remainder of the time T a charge $$T\ .\ i \tag{13}$$

is produced or a potential:

$$V = \frac{Ti}{C} \tag{14}$$

The conduction of the uni-junction transistor 1.1 occurs when $$(V + \Delta V) = Vr \tag{15}$$

If we take:

$$\frac{[\Delta T\ (+\Delta i) + Ti]}{C} = Vr \tag{16}$$

then:

$$\Delta T = \frac{(CVr - Ti)}{(i + \Delta i)} \tag{17}$$

or:

$$T = \frac{CVr - \Delta T\,(i + 66\,i)}{i} \tag{18}$$

The complete period is equal to (T + ΔT) = T* or:

$$T^* = \frac{CVr}{i} - \Delta T\ \frac{\Delta i}{i} = \frac{1}{i}(CVR - \Delta T \cdot \Delta i) = \frac{Vr}{i}\left(C - \frac{\Delta T \cdot \Delta i}{Vr}\right) \tag{19}$$

We see then that the device behaves exactly as if we had introduced a negative capacity equal to $$\frac{\Delta T \cdot \Delta i}{Vr}$$

This term makes it possible to cancel, for example, the term $C_p$, even to over-compensate for it. For example, in the case of the use of the frequency with a device of the second type, we obtain $$T^* = \frac{Vr}{i}\left(\frac{1}{A \pm Bx} + Cp - \frac{\Delta T \cdot \Delta i}{Vr}\right) \tag{20}$$

It is sufficient to regulate the circuit so that:

$$\frac{(\Delta T \cdot \Delta i)}{Vr} = Cp \tag{21}$$

or:

$$\Delta T = \frac{Cp \cdot Vr}{\Delta i} \tag{22}$$

to obtain:

$$\frac{1}{T^*} = f^* = \frac{1}{Vr}(\Delta \pm Bx) \tag{23}$$

which is perfectly linear.

Figure 2:
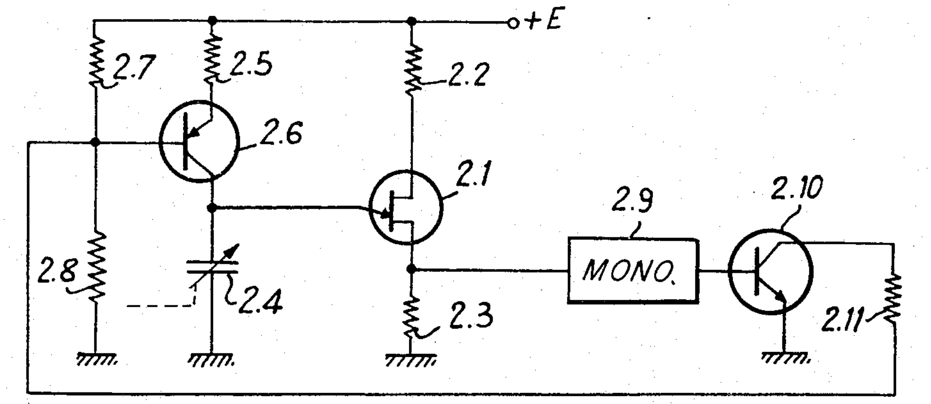
FIG. 2 is an electrical circuit diagram of a measuring device according to the invention, for producing a more linear charge of the capacitor.

FIG. 2 shows the arrangement of a device such that each oscillation triggers a monostable multivibrator for duration ΔT which changes current $i$ into $(i + \Delta i)$.

The circuit is similar to that of FIG. 1 and similar suffix numbers are used for the same components previously described. A current generator is formed by a transistor 2.6 and a resistor 2.5 connected to the emitter of the transistor and voltage source E. The variable capacitor 2.4 is connected between the collector of the transistor and the common point. The base of the transistor is biased by a voltage divider formed of resistors 2.7, 2.8. This arrangement produces the normal charge current $i$.

Capacitor 2.4 can charge to a potential sufficient to turn on uni-junction transistor 2.3 thereby discharging the capacitor through resistor 2.3. This produces a voltage pulse across resistor 2.3 which triggers a monostable multivibrator 2.9 (not detailed, but known). The output of 2.9 is applied to the base of a transistor 2.10 and transistor 2.10 is held conductive for time ΔT, the duration that the monostable 2.9 is triggered on. The output of transistor 2.10 is applied through resistor 2.11 to the base of transistor 2.6 causing a complementary polarization of transistor 2.6, i.e., 2.6 goes more conductive as 2.10 becomes more conductive.

We then have: $$\Delta V = \frac{ER_{2.8}}{R_{2.8} + R_{2.7}} \quad (24)$$

from which $i$ can be obtained.

$$\Delta W^* = E \left[ \frac{\frac{R_{2.8} \cdot R_{2.11}}{R_{2.8} + R_{2.11}}}{\frac{R_{2.8} \cdot R_{2.11}}{R_{2.8} + R_{2.11}} + R_{2.7}} \right] \quad (25)$$

from which $(i + \Delta i)$ can be obtained.

Figure 3:
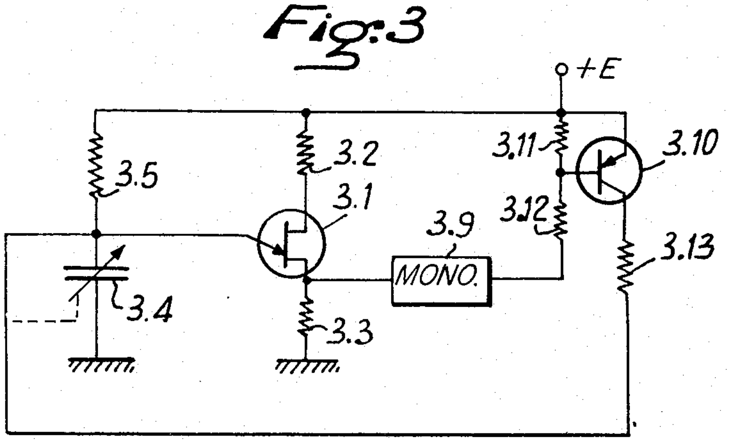
FIG. 3 is an electrical circuit diagram of a measuring device according to the invention for producing an exponential charge of the capacitor.

The device also functions in the case of an exponential charge, as shown by FIG. 3. In this circuit, the charge of capacitor 3.4 is normally made via resistor 3.5 giving a time constant $R_{3.5} \cdot C_{3.4}$.

During the time ΔT, the charge time constant is $$C_{3.4} \left( \frac{R_{3.5} \cdot R_{3.13}}{R_{3.5} + R_{3.13}} \right) \quad (26)$$

because the monostable circuit 3.9, via resistor 3.12, makes transistor 3.10 conductive. During ΔT, the output of 3.9 is low. During normal charge, 3.10 is blocked by 3.11 if the output of 3.9 is high.

In the various embodiment of the invention the on time of its monostable multivibrator can be selected by using the appropriate values for its components.

What is claimed is:

1. Oscillator means operating from a voltage source for producing variable frequency output pulses in response to measurement of a physical displacement, said oscillator means including:

a capacitor having a variable element, means responsive to a physical displacement to control said variable element and produce a variation in the capacitance value of the capacitor, charging means connected to said capacitor and to said voltage source providing a current for charging said capacitor, means connected to said capacitor and responsive to a threshold voltage charge thereon for discharging said capacitor each time said threshold voltage is sensed, said threshold voltage dependent upon the capacitance value of the capacitor, and means connected to said charging means and responsive to its discharge of the capacitor for modifying the charging current for the capacitor for a predetermined time during its charging period.

2. Oscillator means as in claim 1 wherein said last named means increases the charging current in a substantially linear manner during said predetermined time.

3. Oscillator means as in claim 1 wherein said last named means increases the charging current in a non-linear manner during said predetermined time.

4. Oscillator means as in claim 1 wherein said discharge means comprises a unijunction transistor means and said last named means comprises a monostable circuit means connected to said unijunction transistor means and operative to change the charging current upon discharge of the capacitor by said unijunction transistor means.

5. Oscillator means as in claim 1 wherein said last named means includes a monostable circuit means.

6. Oscillator means as in claim 5 wherein said last named means also includes means responsive to the discharge of said capacitor for causing said monostable circuit means to assume a first state, the current being increased for the time that said monostable circuit means is in said first state.

7. Oscillator means as in claim 1 wherein said current providing means includes a variable conductivity device and said last named means includes means for changing the conductivity of said variable conductive device during said predetermined time.

8. Oscillator means as in claim 7 wherein said means for changing the conductivity comprises a monostable circuit means, and means connecting the output of said monostable circuit means to supply a signal to said variable conductivity means.

9. Oscillator means as in claim 1 further comprising a resistor in series within said capacitor to vary its charging rate.

* * * * *